United States Patent
Liu

(10) Patent No.: US 9,617,440 B2
(45) Date of Patent: Apr. 11, 2017

(54) INK COMPOSITIONS COMPRISING SURFACTANTS HAVING LIMITED SOLUBILITY

(71) Applicant: Cabot Corporation, Boston, MA (US)

(72) Inventor: Tianqi Liu, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/379,107

(22) PCT Filed: Aug. 16, 2013

(86) PCT No.: PCT/US2013/055361
§ 371 (c)(1),
(2) Date: Aug. 15, 2014

(87) PCT Pub. No.: WO2015/023293
PCT Pub. Date: Feb. 19, 2015

(65) Prior Publication Data
US 2016/0222237 A1    Aug. 4, 2016

(51) Int. Cl.
*C09D 11/322*    (2014.01)
*C09D 11/324*    (2014.01)
(Continued)

(52) U.S. Cl.
CPC ............ *C09D 11/38* (2013.01); *C09D 11/322* (2013.01); *C09D 11/326* (2013.01)

(58) Field of Classification Search
CPC ... C09D 11/322; C09D 11/324; C09D 11/326; C09D 11/38
(Continued)

(56) References Cited

U.S. PATENT DOCUMENTS 6,336,965 B1 *  1/2002  Johnson ............... C09D 11/322
                                                 106/31.6
6,454,403 B1 *  9/2002  Takada ................. C09D 11/40
                                                 347/100
(Continued)

FOREIGN PATENT DOCUMENTS

EP          1908806 A1      4/2008
WO     WO 2011/078842 A1    6/2011
WO     WO 2011/099977 A1    8/2011

OTHER PUBLICATIONS

National Center for Biotechnology Information, PubChem Compound Database; CID=104057; https://pubchem.ncbi.nlm.nih.gov/compound/104057; no date available; 13 pages.*

(Continued)

*Primary Examiner* — Helene Klemanski

(57) ABSTRACT

Disclosed herein are ink compositions comprising a self-dispersed pigment in a liquid vehicle. The liquid vehicle can comprise a solvent/water mixture in which the composition further comprises a surfactant system having limited solubility/compatibility with the liquid vehicle. Also disclosed are surfactant systems comprising at least a first and a second surfactant, where the first surfactant is selected from alkoxylated alkyne-containing alkylene diols and N-alkyl pyrrolidones, and wherein the first surfactant has a solubility of less than 0.5% in a 5% glycerol/water mixture, and where the a second surfactant is selected from acetylene alcohols comprising linear or branched $C_1$-$C_{14}$ alkyls, and alkoxylated phosphate esters.

14 Claims, 7 Drawing Sheets

(51) Int. Cl.
*C09D 11/326* (2014.01)
*C09D 11/38* (2014.01)

(58) Field of Classification Search
USPC .......................................... 106/31.78, 31.86
See application file for complete search history.

(56) References Cited

U.S. PATENT DOCUMENTS

| | | | | |
|---|---|---|---|---|
| 6,524,383 | B2* | 2/2003 | Komatsu | C09D 11/322 |
| | | | | 106/31.86 |
| 6,916,862 | B2* | 7/2005 | Ota | C09D 11/322 |
| | | | | 523/160 |
| 7,872,060 | B2* | 1/2011 | Schmid | C09D 11/30 |
| | | | | 428/423.1 |
| 8,360,569 | B2* | 1/2013 | Chen | C09D 11/326 |
| | | | | 106/31.6 |
| 8,770,736 | B2* | 7/2014 | Vasudevan | C09D 11/38 |
| | | | | 106/31.6 |
| 9,187,664 | B2* | 11/2015 | Tyrell | C09D 11/38 |
| 2002/0075369 | A1* | 6/2002 | Ota | C09D 11/322 |
| | | | | 347/100 |
| 2004/0186200 | A1* | 9/2004 | Yatake | C09D 11/38 |
| | | | | 106/31.86 |
| 2006/0103706 | A1 | 5/2006 | Aikawa et al. | |
| 2007/0225400 | A1* | 9/2007 | Schmid | C09D 11/30 |
| | | | | 523/160 |
| 2010/0277526 | A1* | 11/2010 | Chen | C09D 11/326 |
| | | | | 347/9 |
| 2012/0019588 | A1* | 1/2012 | Mubarekyan | C09D 11/30 |
| | | | | 347/20 |
| 2012/0249661 | A1* | 10/2012 | Tyrell | C09D 11/38 |
| | | | | 347/20 |
| 2013/0331486 | A1* | 12/2013 | Kasahara | C09D 11/322 |
| | | | | 524/90 |

OTHER PUBLICATIONS

Croda-Phosphate Esters; Croda International; www.croda.com/download.aspx?s=1&m=doc&id=b1d62e14-1d16-43f9-9951-4af7e44ca372; 2009, no month available; 4 pages.*
The International Search Report and The Written Opinion of the International Searching Authority, or the Declaration for PCT/US2013/055361, mailed from the European Patent Office on May 9, 2014.

* cited by examiner 100 micron

INK COMPOSITIONS COMPRISING SURFACTANTS HAVING LIMITED SOLUBILITY

RELATED APPLICATION

This is a national phase application under 35 U.S.C. §371 of PCT Application PCT/US13/55361, filed Aug. 16, 2013.

FIELD OF THE INVENTION

Disclosed herein are ink compositions comprising new surfactant systems.

BACKGROUND

There is a continual need to improve inkjet printing performance by optimizing one or more variables in an inkjet ink composition. Much development focuses on the pigment to improve parameters such as optical density (O.D.) Ink compositions, however, typically contain other components such as solvents and surfactants that can interface with the pigment and affect overall printing ability. Accordingly, there remains a need for continued development of ink compositions.

SUMMARY

One embodiment provides an inkjet ink composition, comprising:
(a) at least one pigment;
(b) a first surfactant selected from alkoxylated alkyne-containing alkylene diols and N-alkyl pyrrolidones, wherein the first surfactant has a solubility of less than 0.5% in a 5% glycerol/water mixture;
(c) a second surfactant selected from:
　(i) acetylene alcohols comprising linear or branched $C_1$-$C_{14}$ alkyls, or
　(ii) alkoxylated phosphate esters; and
(d) at least one solvent.

Another embodiment provides an inkjet ink composition, comprising:
(a) at least one pigment;
(b) a first surfactant selected from the following structures:

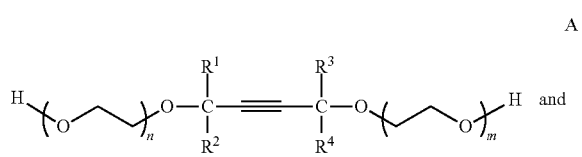

A

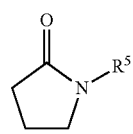

B wherein $R^1$-$R^5$ are each independently selected from linear and branched $C_1$-$C_{20}$ alkyls, and n and m are independently selected from integers such that n+m≥1;
(c) a second surfactant selected from the following structures:

(i)

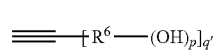

C wherein $R^6$ is selected from linear and branched $C_1$-$C_{14}$ alkyls, wherein OH can be bonded to any carbon in the $C_1$-$C_{14}$ alkyl, p is ≥1, and q is 1 or 2, or (ii)

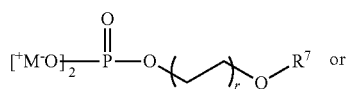

D

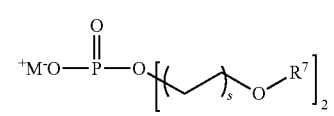

E and mixtures thereof, wherein $R^7$ and $R^8$ are independently selected from linear and branched $C_1$-$C_7$ alkyls, $C_5$-$C_{20}$ aryls, $C_6$-$C_{25}$ alkaryls, and $C_6$-$C_{25}$ aralkyls, r and s are independently selected from integers ranging from 1 to 7, and $M^+$ is a counterion; and
(d) at least one solvent.

BRIEF DESCRIPTION OF THE DRAWING(S)

DETAILED DESCRIPTION

In inkjet printing, high optical density (O.D.) is desired not only at high resolutions but also in medium/low resolutions. While O.D. is affected by dot density, for bond paper the O.D. can be improved with increased dot spreading as more dot spreading minimizes the white area between dots. In contrast, when printing on coated paper, the puddling of ink droplets is often a problem; puddling is typically reduced by increasing ink liquid penetration. However, because high O.D. results from high pigment density on the paper surface, increased ink penetration may be detrimental to O.D.

Depending on the type of printing and the paper treatment, ink manufacturers are often faced with balancing potentially competing effects, e.g., as described above. Surfactants in inkjet inks are used to modify surface tension, which can facilitate one or more of ink transport in a print head, drop ejection from a firing chamber, and drop spreading and penetration on substrates. Organic solvents are used in inkjet inks as humectants to for viscosity control and to prevent nozzle drying.

One embodiment provides a surfactant system that facilitates (1) maintaining dot density by minimizing ink penetration into a substrate (e.g., paper), and/or (2) enhancing ink spreading when deposited on a substrate.

In one embodiment, the ink penetration into a substrate is minimized with a surfactant having limited solubility in the liquid vehicle of the ink composition. This can be useful for all paper types (e.g., coated or uncoated). Without wishing to be bound by any theory, surfactants can adsorb to the pigment surface and add steric stabilization. Other stabilization forces include electrostatic or steric forces imparted by surface treatment, encapsulation, or any other forms of stabilization known to those skilled in the art. In some instances, however, the added stability by surfactant adsorption may not be desired because pigment particles typically transition from a stable form in a dispersed state to a quickly-agglomerated state when deposited onto a substrate. While this agglomerated state can produce good optical density upon printing, the added stability may hinder agglomeration of particles. The organic solvent can also affect the ability of a surfactant to adsorb on a pigment surface.

Figure 1A:
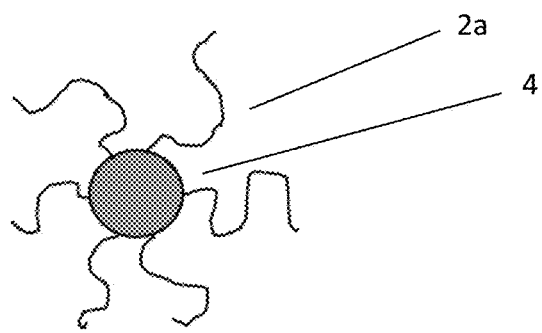
FIG. 1A is a schematic of a pigment having adsorbed surfactant chains with favorable surfactant-solvent interactions.
Figure 1B:
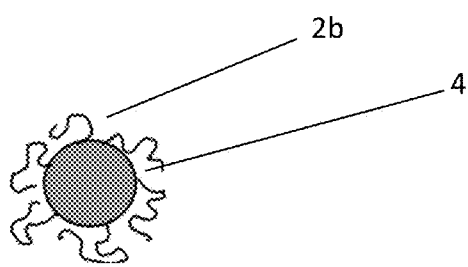
FIG. 1B is a schematic of a pigment having adsorbed surfactant chains with unfavorable surfactant-solvent interactions.

Without wishing to be bound by any theory, the effects of surfactant-solvent interactions are schematically illustrated in FIGS. 1A and 1B. When a self-dispersed pigment is placed in a liquid vehicle containing organic solvents and surfactants, the surfactant will selectively adsorb to the pigment surface. FIG. 1A shows pigment 4 having adsorbed thereon surfactant chains 2a, in which chains 2a are well-stretched due to favorable surfactant-solvent interactions, promoting steric stabilization. In contrast, FIG. 1B shows adsorbed chains 2b in a collapsed state as a result of unfavorable surfactant-solvent interactions. It has been discovered that such unfavorable interactions can actually minimize steric stabilization of the pigment, thereby promoting agglomeration that can lead to higher optical density. Such effects can be useful when printing on all paper types (e.g., coated or uncoated).

One test for limited solubility in a liquid vehicle is determining whether the surfactant has a solubility of less than 0.5% in the liquid vehicle. In one embodiment, the ink composition comprises a liquid vehicle that is aqueous-based, e.g., at least 50% water, or at least 80%, or at least 90% water. In one embodiment, the ink composition comprises a liquid vehicle that is a solvent/water mixture comprising at least one solvent in an amount ranging from 1% to 60% by weight, e.g., from 1% to 50% by weight, from 1% to 40% by weight, from 1% to 30% by weight, from 1% to 20% by weight, from 1% to 10% by weight, or from 1% to 5% by weight, relative to the total weight of the ink composition. In one embodiment, the inkjet ink composition is an aqueous dispersion.

In one embodiment, the surfactant has a solubility of less than 0.5% in a 5% solvent/water mixture, which may indicate a surfactant that is capable of minimizing ink penetration in a substrate. In one embodiment, the at least one solvent is selected from glycerol, alkylene glycols (e.g., mono-, di-, tri-, and tetra-ethylene glycol), alkylene diols, alkylene triols, 2-pyrrolidone, 1-hydroxyethyl pyrrolidone, xylitol, and sorbitol, and mixtures thereof. Exemplary solvents for a solvent/water mixture are described in further detail below. For example, the surfactant has a solubility of less than 0.5% in a 5% glycerol/water mixture, a solubility of less than 0.5% in a 5% ethylene glycol/water mixture or a solubility of less than 0.5% in a 5% 2-pyrrolidone/water mixture.

Accordingly, one embodiment provides a surfactant having limited solubility in a liquid vehicle, which may promote coagulation/agglomeration (and may minimize ink penetration) that can result in improved dot density and thus, improved O.D. values. In one embodiment, the surfactant is selected from nonionic surfactants, such as alkoxylated (e.g., ethoxylated) alkyne-containing alkylene diols and N-alkyl pyrrolidones. In one embodiment, the surfactant is a first surfactant capable of minimizing ink penetration. In one embodiment, the first surfactant is selected from the following structures:

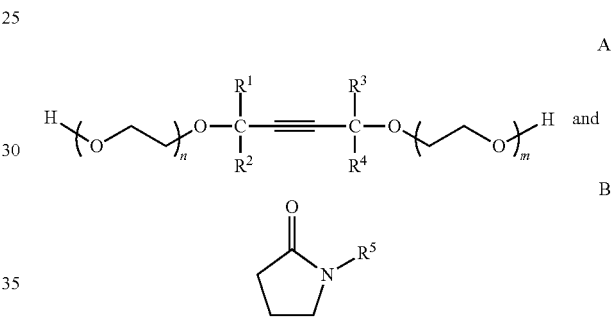

wherein $R^1$-$R^5$ are each independently selected from linear and branched $C_1$-$C_{20}$ alkyls, and n and m are independently selected from integers wherein at least one of n and m 1, e.g., n+m≥1. In another embodiment, n+m ranges from 1 to 9, e.g., from 1 to 8, from 1 to 7, from 1 to 6, from 1 to 5, from 2 to 9, from 2 to 8, from 2 to 7, from 2 to 6, or from 2 to 5. In one embodiment, $R^5$ is selected from linear and branched $C_3$-$C_{20}$ alkyls, e.g., linear and branched $C_3$-$C_{12}$ alkyls. In one embodiment, $R^1$-$R^4$ are each independently selected from linear and branched $C_1$-$C_{12}$ alkyls.

Exemplary surfactants of formula A include Surfynol® 440 and Dynol® 604, commercially available from Air Products and Chemicals, Inc. Exemplary surfactants of formula B including those commercially available under the trade name Surfadone® (e.g., the Surfadone® LP series) commercially available from International Specialty Products.

Another embodiment provides a surfactant system that enhances ink spreading when deposited on a substrate. By enhancing ink spreading, ink droplets that are deposited on a substrate (e.g., paper) cover more area of the substrate, which can also lead to improved O.D. Without wishing to be bound by any theory, surfactants that can enhance ink spreading have one or more criteria is selected from: fast diffusion rate to interface with paper surface; poorly hydrated in vehicle (reduced compatibility with vehicle); small size; and/or fast dissociation constants of surfactant micelles (minimizing surfactant micelle formation increases the number of available surfactant molecules for interfacing with the pigment surface). In one embodiment, surfactants that enhance ink spreading are useful for more porous paper types, e.g., bond paper.

In one embodiment, the surfactant system comprises at least a first and a second surfactant, where the first surfactant performs the function maintaining dot density, as described above) and the second surfactant performs the function of enhancing ink spreading.

In one embodiment, the second surfactant, which can be nonionic or anionic, is selected from acetylene alcohols, e.g., acetylene alcohols comprising linear or branched $C_1$-$C_{14}$ alkyls, e.g., linear and branched $C_1$-$C_{12}$ alkyls. In one embodiment, the surfactant comprises no alkylene oxide units (e.g., no ethylene oxide unites). Generally, such alkylene oxides tend to hydrate in aqueous solution, which may cause too much drag due to hydrogen bonding.

In one embodiment, the second surfactant is selected from the structure:

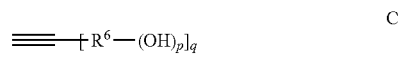

C wherein $R^6$ is selected from linear and branched $C_1$-$C_{14}$ alkyls, wherein OH can be bonded to any carbon in the $C_1$-$C_{14}$ alkyl, p is ≥1, and q is 1 or 2. One skilled in the art would understand that when q is equal to 2, structure C comprises an "$R^6$—$(OH)_p$" group bonded to each carbon of the alkyne unit.

In one embodiment, $R^6$ is selected from linear and branched $C_1$-$C_{12}$ alkyls. In one embodiment, p ranges from 1 to 5.

Exemplary surfactants of formula C include Surfynol® 61, commercially available from Air Products and Chemicals, Inc.

Another embodiment provides a two-surfactant system in which a first surfactant has limited solubility in a liquid vehicle, and a second surfactant that promotes ink liquid penetration. In one embodiment, increased ink liquid penetration provides less liquid on the paper surface, which can result in faster drying times. Such a surfactant can be useful when printing on coated paper in which puddling of ink droplets can present a problem. The second surfactant can be ionic or nonionic. In one embodiment, the second surfactant is selected from alkoxylated (e.g., ethoxylated) phosphate esters. In one embodiment, the second surfactant is selected from one of the following structures:

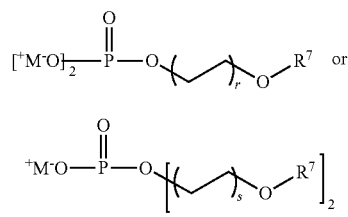

and mixtures thereof, wherein $R^7$ and $R^8$ are independently selected from linear and branched $C_1$-$C_7$ alkyls, $C_5$-$C_{20}$ aryls, $C_6$-$C_{25}$ alkaryls, and $C_6$-$C_{25}$ aralkyls, r and s are independently selected from integers ranging from 1 to 7, and $M^+$ is a counterion. In one embodiment, $M^+$ is a counterion selected from $Na^+$, $K^+$, $Li^+$, $NR'_4{}^+$, where $R'$ represents hydrogen or an organic group, such as substituted or unsubstituted $C_5$-$C_{20}$ aryls and linear, branched, and cyclic $C_1$-$C_{20}$ alkyls.

Exemplary surfactants of formula D or E include Crodafos® MPH1A phosphate esters, commercially available from Croda International Plc.

In one embodiment, the first and/or second surfactant (e.g., a sum of the first and second surfactant) is present in an amount ranging from 0.05% to 5%, e.g., an amount ranging from 0.1% to 5%, or from 0.5% to 2%, by weight relative to the total weight of the inkjet ink composition.

With the increasing need for versatile custom-scale commercial printings, inkjet-based technologies have displayed advantages over technologies such as offset technology due to their flexibility and lower cost. Commercial printing (or high speed printing) includes transactional, book printing (trade books, educational books, etc.), direct mail, and magazine printing. Commercial printing differs from desktop/office printing in terms of speed, reliability and print quality. High speed inkjet printing can be either sheet fed or web fed. Web press inkjet printing is a commercial printing technology developed to print on a continuous paper web at rates of hundreds of feet per minute. (In contrast, the rate of desktop printing is generally less than 50 pages per minute for black only.) In one embodiment, the high speed printing is performed at a rate of at least 100 ft./min for four color printing. The firing frequency for high speed printing can be at least 15 kHz. (Desktop printing firing frequencies are typically less than 15 kHz due to the lower print speeds.)

High printing speeds may compromise O.D., resulting in lower resolution. While improvement in O.D. is desired for most printing applications, in one embodiment, the ink compositions comprising the surfactant systems disclosed herein can be useful for commercial printing applications.

Pigments

Pigments are solid materials, generally in the form of a particulate or in a form readily formed into a particulate, such as a pressed cake. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). In one embodiment, the pigment has no primary amines.

Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellow include Pigment Yellow 117 and Pigment Yellow 138. Other suitable examples of pigments include yellow pigments such as Pigment Yellow 1, 74, 128, 139, 155, 180, 185, 213, 218, 220, and 221, red pigments such as Pigment Red 177, 185, 254, and 269, blue pigments such as Pigment Blue 16 and 60, orange pigments such as Pigment Orange 168, and green pigments such as Pigment Green 7 and 36. Examples of other suitable colored pigments are described in Colour Index, 3rd edition (The Society of Dyers and Cikiyrusts, 1982).

The pigments may further incorporate additional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

In one embodiment, the pigment is a self-dispersed pigment, e.g., selected from oxidized carbon black and pigments having attached at least one organic group. Such self-dispersed pigments can be prepared by modifying any of the pigments disclosed herein.

In one embodiment, the self-dispersed pigment is an oxidized carbon black. In one embodiment, "oxidized carbon blacks" are carbon black pigments generally having a pH<7.0 that feature surface-bound ionic or ionizable groups such as one or more of alcohols (phenols, naphthols), lactones, carbonyls, carboxyls (e.g., carboxylic acids), anhydrides, ethers, and quinones. The extent of oxidation of carbon black can determine the surface concentration of these groups. In one embodiment, the oxidized carbon black is obtained by oxidizing an unmodified carbon black, e.g., pigments selected from channel blacks, furnace blacks, gas blacks, and lamp blacks. Exemplary unmodified carbon blacks include those commercially available from Cabot Corporation as Regal®, Black Pearls®, Elftex®, Monarch®, Mogul®, and Vulcan®, such as Black Pearls® 1100, Black Pearls® 900, Black Pearls® 880, Black Pearls® 800, Black Pearls® 700, Black Pearls® 570, Elftex® 8, Monarch® 900, Monarch® 880, Monarch® 800, Monarch® 700, Regal® 660, and Regal® 330. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof (e.g., mixtures of gaseous oxidants such as oxygen and ozone). In another embodiment, the oxidized carbon black is obtained from commercial sources, such as Black Pearls® 1400, Black Pearls® 1300, Black Pearls® 1000, Black Pearls® L, Monarch® 1000, Mogul® L, and Regal® 400, available commercially from Cabot Corporation.

In one embodiment, the pigment has attached at least one organic group where an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, —$SO_3^-$, —$OSO_3^-$, —$HPO_3^-$; —$OPO_3^{2-}$, or —$PO_3^{2-}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—$C_6H_4$—COOH group), a benzene dicarboxylic acid group, a benzene tricarboxylic acid group, a benzene sulfonic acid group (a —C$_6$H$_4$—SO$_3$H group), or salts thereof. In one embodiment, surface modification to introduce ionic or ionizable groups onto a pigment surface, such as chlorination and sulfonylation, may also be used.

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) U.S. Pat. Nos. 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In one embodiment, the organic group is derived from amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —CQ(PO$_3$H$_2$)$_2$, partial esters thereof, or salts thereof, wherein Q is bonded to the geminal position and may be H, R, OR, SR, or NR$_2$ wherein R", which can be the same or different, is defined as above, or can be H, a C$_1$-C$_{18}$ saturated or unsaturated, branched or unbranched alkyl group, a C$_1$-C$_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), U.S. Pat. No. 6,936,097, U.S. Pub. Nos. 2001/0036994, 2003/0101901 (reaction with organic groups having —N=N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference. Further examples of representative organic groups are described in U.S. Pat. Nos. 5,571,311; 5,630,868; 5,707,432, 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, the disclosures of which are incorporated herein by reference.

The amount of attached organic groups can be varied, depending on the desired use of the modified carbon black and the type of attached group. For example, the total amount of organic group may be from about 0.01 to about 10.0 micromoles of groups/m$^2$ surface area of pigment, as measured by nitrogen adsorption (BET method), including from about 0.5 to about 5.0 micromoles/m$^2$, from about 1 to about 3 micromoles/m$^2$, or from about 2 to about 2.5 micromoles/m$^2$.

In one embodiment, the dispersion can be formulated to provide an amount of pigment such that the final amount in the inkjet ink composition is effective to provide the desired image quality (for example, optical density) without detrimentally affecting the performance of the inkjet ink. In one embodiment, the pigment is present in an amount ranging from 1% to 20% or from 1% to 10% by weight, relative to the total weight of the composition, e.g., an amount ranging from 2% to 10% by weight, from 3% to 10% by weight, from 2% to 7% by weight, or from 3% to 7% by weight, relative to the total weight of the composition.

In one embodiment, the pigment can be modified as above, or unmodified, and the inkjet ink composition comprises polymeric dispersants to disperse or further disperse the pigment ("polymer-dispersed"). In one embodiment, the pigment is polymer-encapsulated. The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Solvents

In one embodiment, the at least one solvent is soluble or miscible with water. In another embodiment, the at least one solvent is chemically stable to aqueous hydrolysis conditions (e.g., reaction with water under heat aging conditions, including, for example, the hydrolysis of esters and lactones). In one embodiment, the at least one solvent has a dielectric constant below that of water, such as a dielectric constant ranging from about 10 to about 78 at 20° C. Examples of suitable solvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ∈-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). The organic solvent can comprise mixtures of organic solvents.

Other Additives

In one embodiment, in addition to the surfactant, the inkjet ink compositions can further comprise one or more suitable additives to impart a number of desired properties while maintaining the stability of the compositions. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0.01% and 40% based on the weight of the inkjet ink composition. In one embodiment, the at least one additive is present in in an amount ranging from 0.05% to 5%, e.g., an amount ranging from 0.1% to 5%, or an amount ranging from 0.5% to 2%, by weight relative to the total weight of the inkjet ink composition Humectants and water soluble organic compounds other than the at least one organic solvent may also be added to the inkjet ink composition, e.g., for the purpose of preventing clogging of the nozzle as well as for providing paper penetration (penetrants), improved drying (drying accelerators), and anti-cockling properties. In one embodiment, the humectant and/or water soluble compound is present in an amount ranging from 0.1% to 10%, e.g., an amount ranging from 1% to 10%, or an amount ranging from 0.1% to 5%, or from 1% to 5%.

Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ∈-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the aqueous dispersions or inkjet ink composition disclosed herein. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5% by weight, 0.05% to 2% by weight, 0.1% to 5% by weight, or 0.1% to 2% by weight, relative to the total weight of the composition.

EXAMPLES

Example 1

This Example describes surfactant systems and correlation with O.D. when incorporated in inkjet ink compositions.

Table 1 provides the results of solubility tests of the surfactants Surfynol® 440 and Surfynol® 465 in solvent/water mixtures (5% glycerol, ethylene glycol (EG), or 2-pyrrolidone (2P)).

TABLE 1

|  | 5% 2P | 5% glycerol | 5% EG |
|---|---|---|---|
| S440 Concentration | | | |
| 0.10% | soluble | soluble | soluble |
| 0.15% | soluble | insoluble | insoluble |
| 0.20% | soluble | insoluble | insoluble |
| S465 Concentration | | | |
| 0.50% | soluble | soluble | soluble |
| 1% | soluble | soluble | soluble |

From Table 1, it can be seen that Surfynol® 440 has limited solubility in the solvent/water mixture, whereas Surfynol® 465 is very soluble in all solvent water combinations.

Table 2 provides physical properties of an ink composition containing a solvent (5 wt %, glycerol, ethylene glycol (EG), and 2-pyrrolidone (2P)), and a surfactant (Surfynol® 465 ("S465") or Surfynol® 440 ("5440")) with a surface modified carbon black as the pigment (4 wt %), as prepared in PCT Publication No. WO 2007/053564, the disclosure of which is incorporated herein by reference. As can be seen from Table 2, all of the ink compositions have similar surface tension, viscosity, and pH values.

TABLE 2

| Surfactant | Solvent (5% in water) | pH | viscosity (cP) | surface tension (mN/m) |
|---|---|---|---|---|
| S465 (0.6%) | Glycerol | 8.48 | 1.46 | 34.1 |
| | EG | 8.52 | 1.46 | 34.5 |
| | 2P | 8.29 | 1.42 | 35.1 |
| S440 (0.2%) | Glycerol | 8.51 | 1.4 | 36.6 |
| | EG | 8.56 | 1.42 | 35.4 |
| | 2P | 8.35 | 1.38 | 36.3 |

Figure 2:
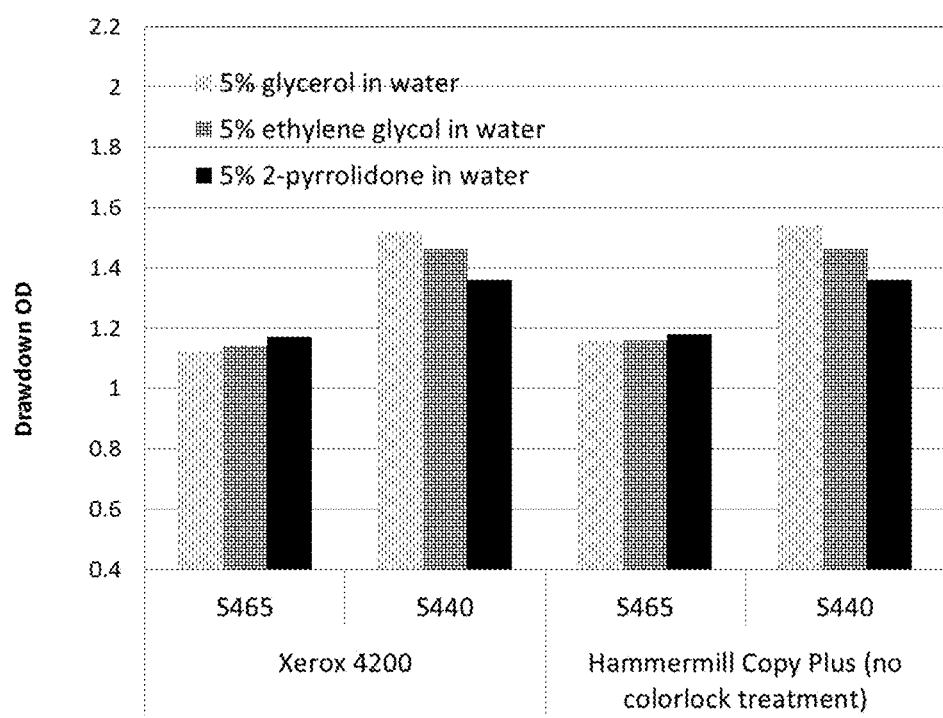
FIG. 2 is a bar graph of drawdown O.D. for the ink compositions of Example 1 printed on two different papers.

FIG. 2 is a bar graph of drawdown O.D. (SpectroEye™ spectrophotometer from GretagMacbeth) for the same ink compositions comprising S465 or S440 printed on two different papers (Xerox and Hammermill copy plus untreated with Colorlok® Technology). It can be seen that that the O.D. of inks containing the lower solubility S440 surfactant is higher than that obtained from inks containing the S465 surfactant. As a significant difference between the two surfactants is solubility in the solvent/water mixture (pH, viscosity, and surface tension being comparable), it can be concluded that the solubility difference contributes to the improvement in O.D. for the ink composition containing a surfactant of the claimed invention. As further evidence of the effects of solubility on O.D., FIG. 2 shows that the O.D. values with 2-pyrrolidone as a solvent are poorer when compared to the values for glycerol and ethylene glycol. This is consistent with the data of Table 1, in which the surfactants are soluble in 2-pyrrolidone for all concentrations, which solubility would disfavor agglomeration and thus, result in lower O.D. values.

Example 2

This Example describes printing performance on uncoated paper with inkjet ink compositions incorporating solvent system according to the claimed invention. Inkjet ink compositions were prepared with the components listed in Table 3. The ink compositions were prepared at room temperature and stirred overnight. Print tests were performed with Epson C88 printers in normal mode. Density wedges from L=0 to L=220 were printed on Finch inkjet treated uncoated papers (Samples 1 and 2 and Comparative Samples 1-6) and measured for O.D. evaluations. For such papers, increased dot spreading would be desired. O.D. values were then plotted against print density (FIGS. 2-6). O.D. was measured by a SpectroEye™ spectrophotometer (GretagMacbeth). Dot size and grey value (the lower the grey value, the higher the dot density) were measured by ImageXpert.

TABLE 3

| tetraethylene glycol | 7-10% |
|---|---|
| 2-pyrrolidone | 2-4% |
| 1,2-hexanediol | 2-3% |
| triethylene glycol monobutyl ether | 1-3% |
| triethylene glycol | 2-4% |
| surface modified carbon black particle | 4.5% |
| surfactant package | see Table 4 |
| balance | water |

The results are shown in Table 4.

TABLE 4

| | | Finch InkJet treated paper | |
|---|---|---|---|
| Sample | Ink Sample Surfactant Package | Average Dot Size (in Pixels) | Dot Grey value |
| Sample 1 | S440/S61 = 0.15/0.8 | 6629 | 83.9 |
| Sample 2 | 1-octyl 2P/S61 = 0.2/0.5 | 6252 | 83.3 |
| Comparative Sample 1 | S440/S465 = 0.15/0.5 | 5931 | 83.6 |
| Comparative Sample 2 | 1-octyl 2P/S465 = 0.2/0.5 | 5180 | 85.1 |

TABLE 4-continued

| Sample | Ink Sample Surfactant Package | Finch InkJet treated paper | |
|---|---|---|---|
| | | Average Dot Size (in Pixels) | Dot Grey value |
| Comparative Sample 3 | S440/2,5-dimethylhexanediol = 0.15/0.6 | 3810 | 85.4 |
| Comparative Sample 4 | S440/7-octene-1,2-diol = 0.15/0.5 | 5479 | 82.9 |
| Comparative Sample 5 | Silwet ® 68/S465 = 0.05/0.5 | 4136 | 89.8 |
| Comparative Sample 6 | Zonyl ® FSO/S465 = 0.01/0.5 | 4308 | 90.2 |

In Table 4, "1-octyl 2P" is Surfadone® LP-100, Silwet® 68 is an ethoxylated polysiloxane available from Momentive Performance Materials, Inc., and Zonyl® FSO is an ethoxylated nonionic fluoro surfactant available from DuPont.

Table 4 demonstrates that the claimed, two-surfactant system fulfills two functions: generate high dot density by a first surfactant, as indicated by the reduced dot grey values, and enable fast spreading by a second surfactant, as indicated by average dot size, which is useful for uncoated papers. Both factors contribute to yield high O.D. at low resolution or faster printing speed.

Figure 3:
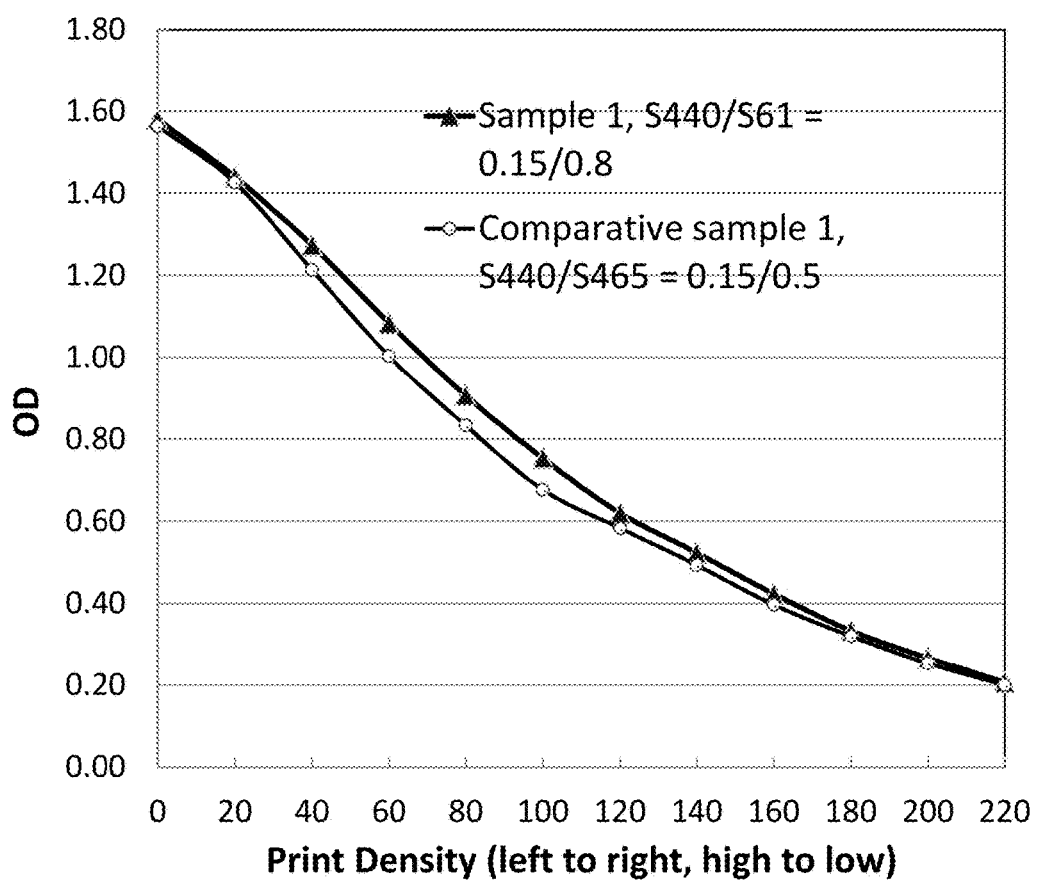
FIG. 3 is a plot of O.D. versus print density for Sample 1 and Comparative Sample 1 of Example 2.
Figure 4:
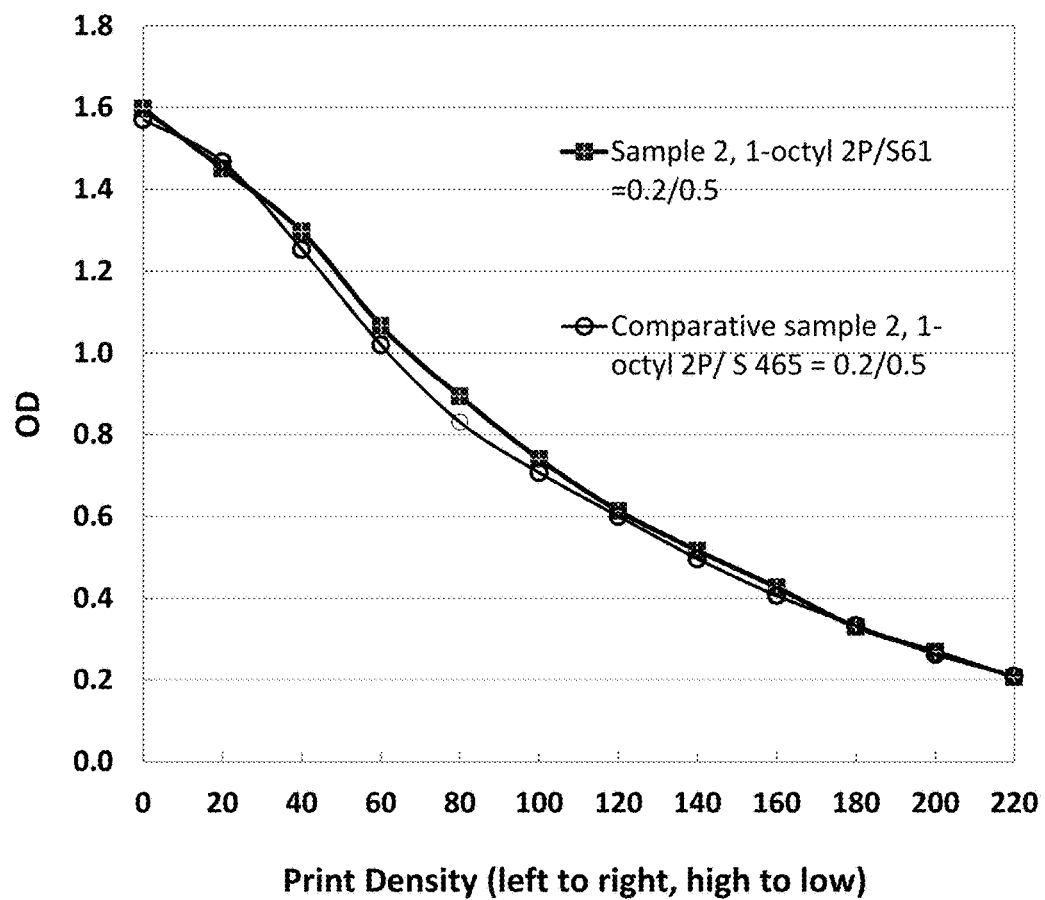
FIG. 4 is a plot of O.D. versus print density, for Sample 2 and Comparative Sample 2 of Example 2.
Figure 5:
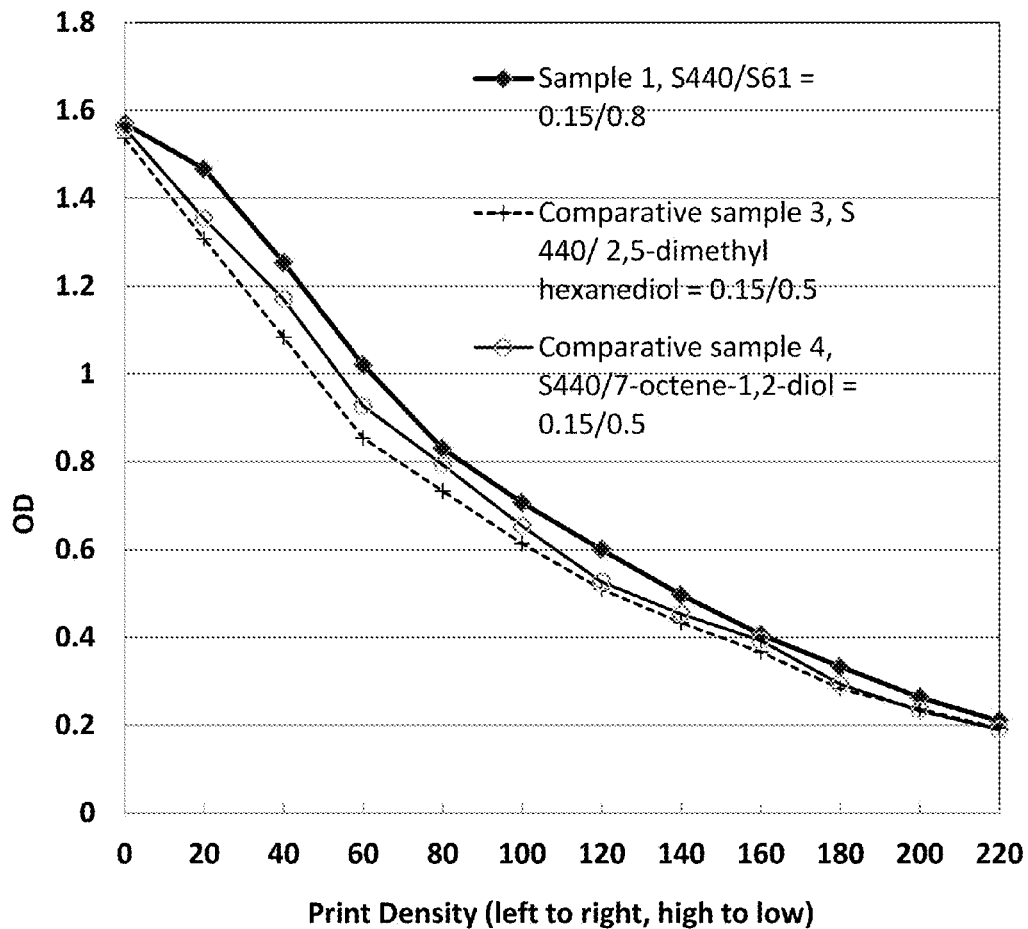
FIG. 5 is a plot of O.D. versus print density for Sample 1 and Comparative Samples 3 and 4 of Example 2.
Figure 6:
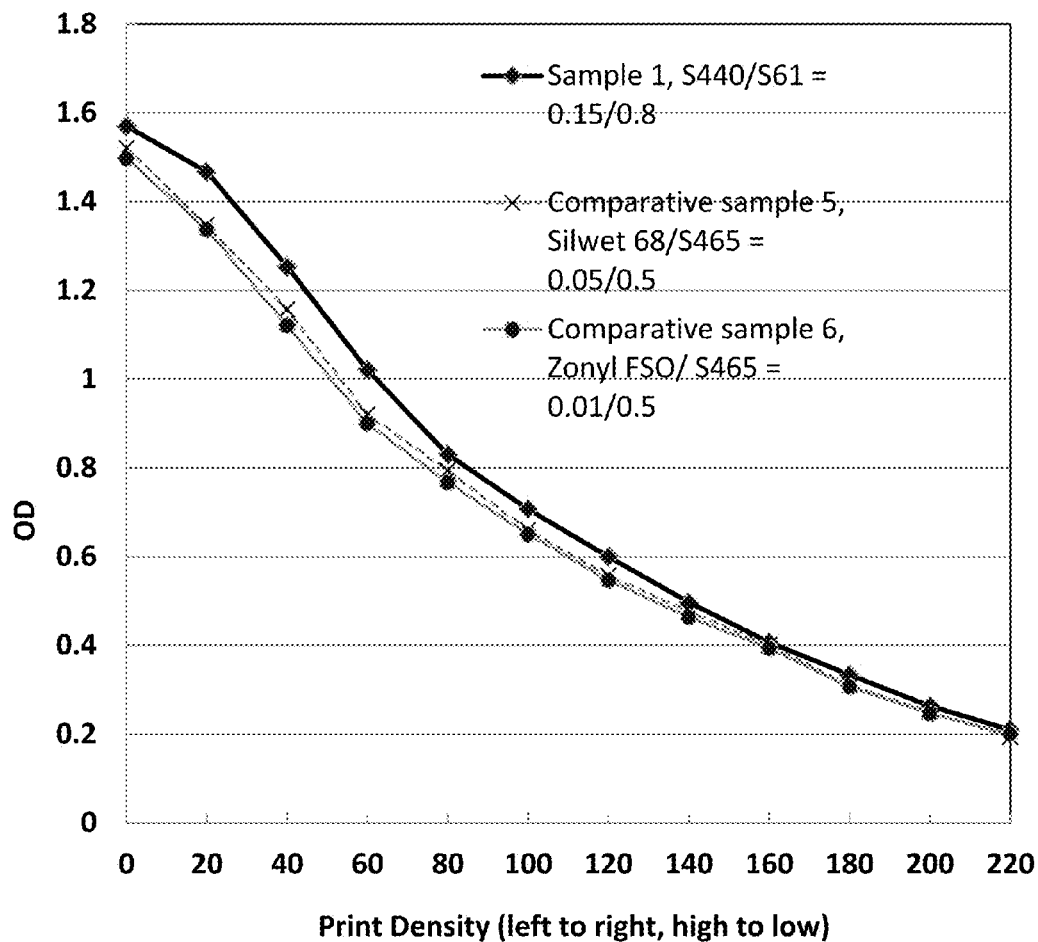
FIG. 6 is a plot of O.D. versus print density for Sample 1 and Comparative Samples 5 and 6 of Example 2.

FIG. 3 is a plot of O.D. versus print density for the results of Sample 1 and Comparative Sample 1. As shown in FIG. 3, Sample 1 provides noticeably higher O.D. over the entire range of print densities tested. Similarly, FIG. 4 is a plot of O.D. versus print density, comparing the results for Sample 2 and Comparative Sample 2, again showing higher O.D. for Sample 2 over almost the entire range of print densities tested. Plots of O.D. versus print density for Sample 1 and Comparative Samples 3 and 4 (FIG. 5), and Sample 1 and Comparative Samples 5 and 6 (FIG. 6), shows higher O.D's for the entire range of print densities.

Example 3

Figure 7:
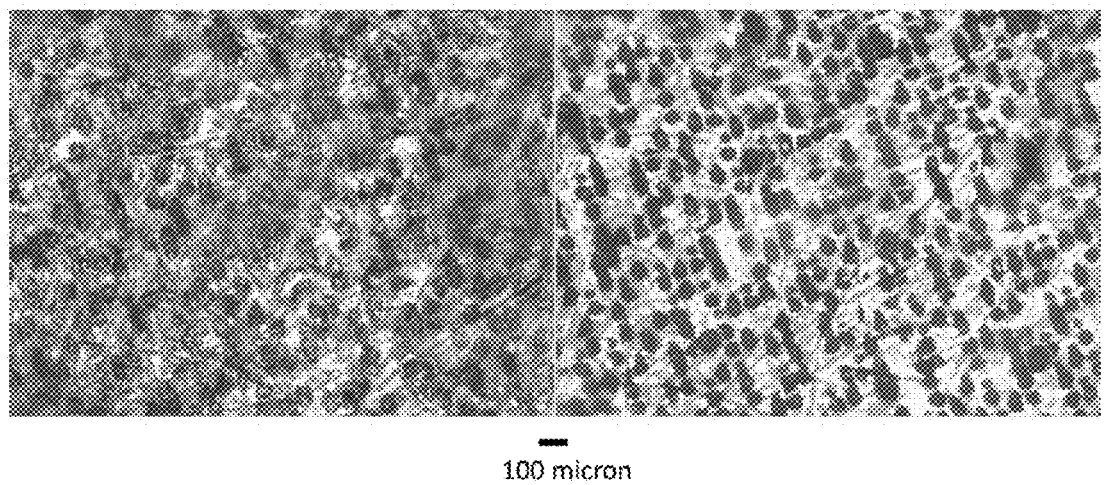
FIG. 7 shows optical micrographs of Sample 3 (right) and Comparative Sample 1 (left) of Example 3 at L=140 on Verso Influence Gloss offset paper.

This Example describes printing performance on coated paper with inkjet ink compositions incorporating solvent system according to the claimed invention. Inkjet ink compositions were prepared with the components listed in Table 3. Ink Samples 3 and 4 were made according to Table 3, incorporating 5440/Crodafos MPH1A (Sample 3) and S440/QS 44 (Sample 4; QS="Triton® QS-44 from The Dow Chemical Company) as surfactant systems. Comparative Sample 1 was used as prepared in Example 2. All three ink samples were printed on Verso Influence Gloss offset paper, FIG. 7 shows optical micrographs of Sample 3 (right) and Comparative Sample 1 (left) at L=140 on Verso Influence Gloss offset paper. For coated papers, optical density is typically not as much a concern as reducing the puddling of ink droplets that can occur. FIG. 7 shows that the ink composition of Sample 3, in accordance with an embodiment of the claimed invention, produces dots of sharper clarity, indicating a reduced amount of puddling. In contrast, Comparative Sample 1 generates puddling on coated paper as seen by the poorer resolution image on the left hand side of FIG. 7. On visual inspection, Sample 4 also reduces puddling (not shown).

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed invention and does not pose a limitation on the scope of the claimed invention unless otherwise claimed. No language in the specification should be construed as indicating any non-claimed element as essential to the practice of the claimed invention.

The invention claimed is:

1. An inkjet ink composition, comprising:
   (a) at least one pigment;
   (b) a first surfactant selected from the following structures:

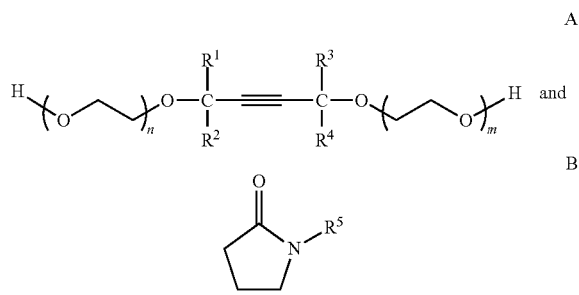

wherein $R^1$-$R^5$ are each independently selected from linear and branched $C_1$-$C_{20}$ alkyls, and n and m are independently selected from integers such that n+m ranges from 2 to 9, and wherein the first surfactant has a solubility of less than 0.5% in a 5% glycerol/water mixture;

(c) a second surfactant selected from the following structures:

(i)

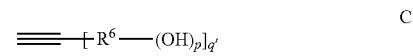

wherein $R^6$ is selected from linear and branched $C_1$-$C_{14}$ alkyls, wherein OH can be bonded to any carbon in the $C_1$-$C_{14}$ alkyl, p is 1, and q is 1 or 2, or (ii)

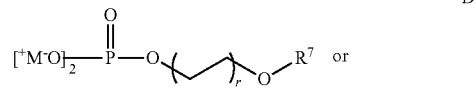

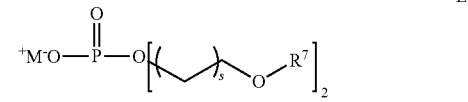

and mixtures thereof, wherein $R^7$ and $R^8$ are independently selected from linear and branched $C_1$-$C_7$ alkyls, $C_5$-$C_{20}$ aryls, $C_6$-$C_{25}$ alkaryls, and $C_6$-$C_{25}$ aralkyls, r and s are independently selected from integers ranging from 1 to 7, and $M^+$ is a counterion; and (d) at least one solvent.

2. The inkjet ink composition of claim 1, wherein the first surfactant is selected from structure A, and wherein n+m ranges from 2 to 5.

3. The inkjet ink composition of claim 1, wherein the first surfactant is selected from structure B and $R^5$ is selected from $C_3$-$C_{20}$ alkyls.

4. The inkjet ink composition of claim 1, wherein the second surfactant is selected from (i), and p ranges from 1 to 5.

5. The inkjet ink composition of claim 1, wherein a sum of the first and second surfactant are present in the composition in an amount ranging from 0.05% to 5% by weight, relative to the total weight of the composition.

6. The inkjet ink composition of claim 1, wherein the inkjet ink composition is an aqueous dispersion.

7. The inkjet ink composition of claim 1, wherein the at least one solvent is present in the composition in an amount ranging from 1% to 60%, relative to the total weight of the composition.

8. The inkjet ink composition of claim 1, wherein the at least one solvent is selected from glycerol, alkylene glycols, alkylene diols, alkylene triols, 2-pyrrolidone, 1-hydroxyethyl pyrrolidone, xylitol, and sorbitol.

9. The inkjet ink composition of claim 1, wherein the pigment is present in the ink composition in an amount ranging from 1% to 20%, relative to the total weight of the composition.

10. The inkjet ink composition of claim 1, wherein the pigment is a self-dispersed pigment.

11. The inkjet ink composition of claim 1, wherein the pigment is selected from oxidized carbon blacks or pigments having an attached organic group.

12. The inkjet ink composition of claim 1, wherein the pigment is polymer-dispersed.

13. The inkjet ink composition of claim 1, wherein the first surfactant has a solubility of less than 0.5% in a 5% ethylene glycol/water mixture.

14. The inkjet ink composition of claim 1, wherein the first surfactant has a solubility of less than 0.5% in a 5% 2-pyrrolidone/water mixture.

* * * * *

UNITED STATES PATENT AND TRADEMARK OFFICE
CERTIFICATE OF CORRECTION

PATENT NO. : 9,617,440 B2
APPLICATION NO. : 14/379107
DATED : April 11, 2017
INVENTOR(S) : Tianqi Liu It is certified that error appears in the above-identified patent and that said Letters Patent is hereby corrected as shown below:

In Column 5, Line 60, " 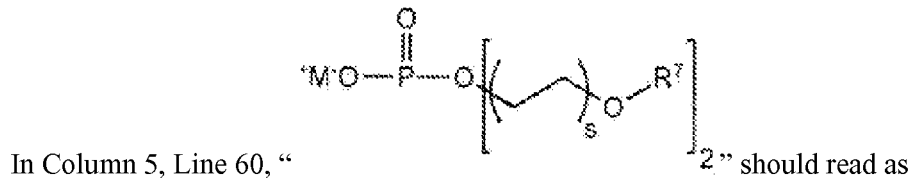 " should read as

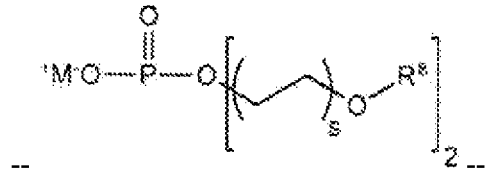 --

In Claim 1, Column 16, Line 53, "p is 1," should read as -- p is ≥ 1, --

In Claim 1, Column 16, Line 64, " 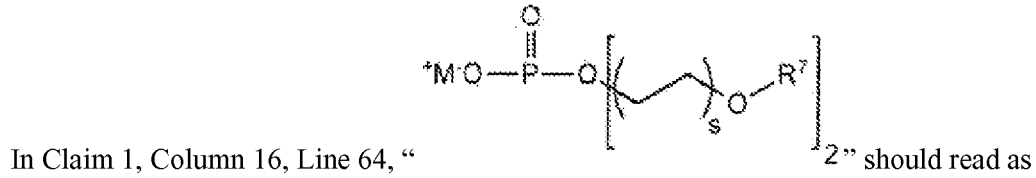 " should read as

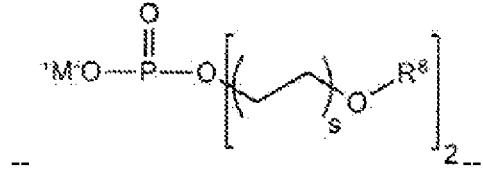 --

Signed and Sealed this
Sixth Day of June, 2017

Michelle K. Lee
*Director of the United States Patent and Trademark Office*